United States Patent [19]

Kaldenbach

[11] Patent Number: 5,044,825

[45] Date of Patent: Sep. 3, 1991

[54] METHOD AND INSTALLATION FOR LAYING A PIPELINE

[75] Inventor: Willem P. Kaldenbach, The Hague, Netherlands

[73] Assignee: Allseas Engineering B.V., Netherlands

[21] Appl. No.: 433,582

[22] Filed: Nov. 8, 1989

[30] Foreign Application Priority Data

Nov. 7, 1988 [NL] Netherlands ......................... 8802725
Oct. 23, 1989 [NL] Netherlands ......................... 8902622

[51] Int. Cl.⁵ ............................................. F16L 1/12
[52] U.S. Cl. .................................... 405/166; 405/170
[58] Field of Search ............... 405/158, 166, 168, 169, 405/170

[56] References Cited

U.S. PATENT DOCUMENTS

| 3,775,987 | 12/1973 | Rochelle et al. | ..................... 405/166 |
| 4,073,156 | 2/1978 | Smith | ............................... 405/166 X |
| 4,230,420 | 10/1980 | Chow | ..................... 405/166 |
| 4,765,776 | 8/1988 | Howson | ............................. 405/169 |

FOREIGN PATENT DOCUMENTS 1155614  6/1969  United Kingdom .

Primary Examiner—David H. Corbin
Attorney, Agent, or Firm—Mark Zovko

[57] ABSTRACT

The laying of a pipeline on a surface located under water is to a great extent continuously performed because the pipes are arranged in line with a pipe string by means of at least two alternately used pipe carriers.

7 Claims, 10 Drawing Sheets

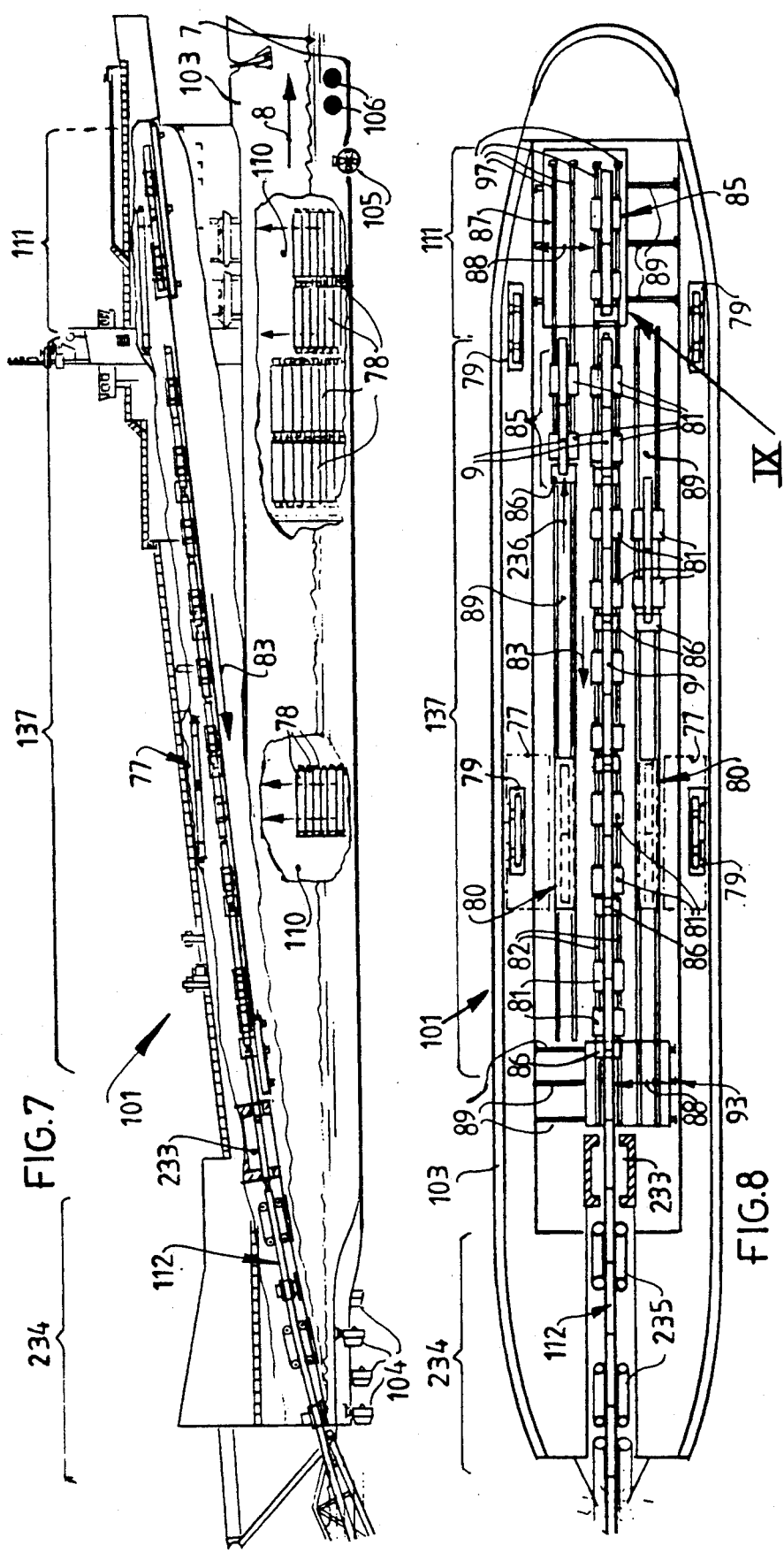

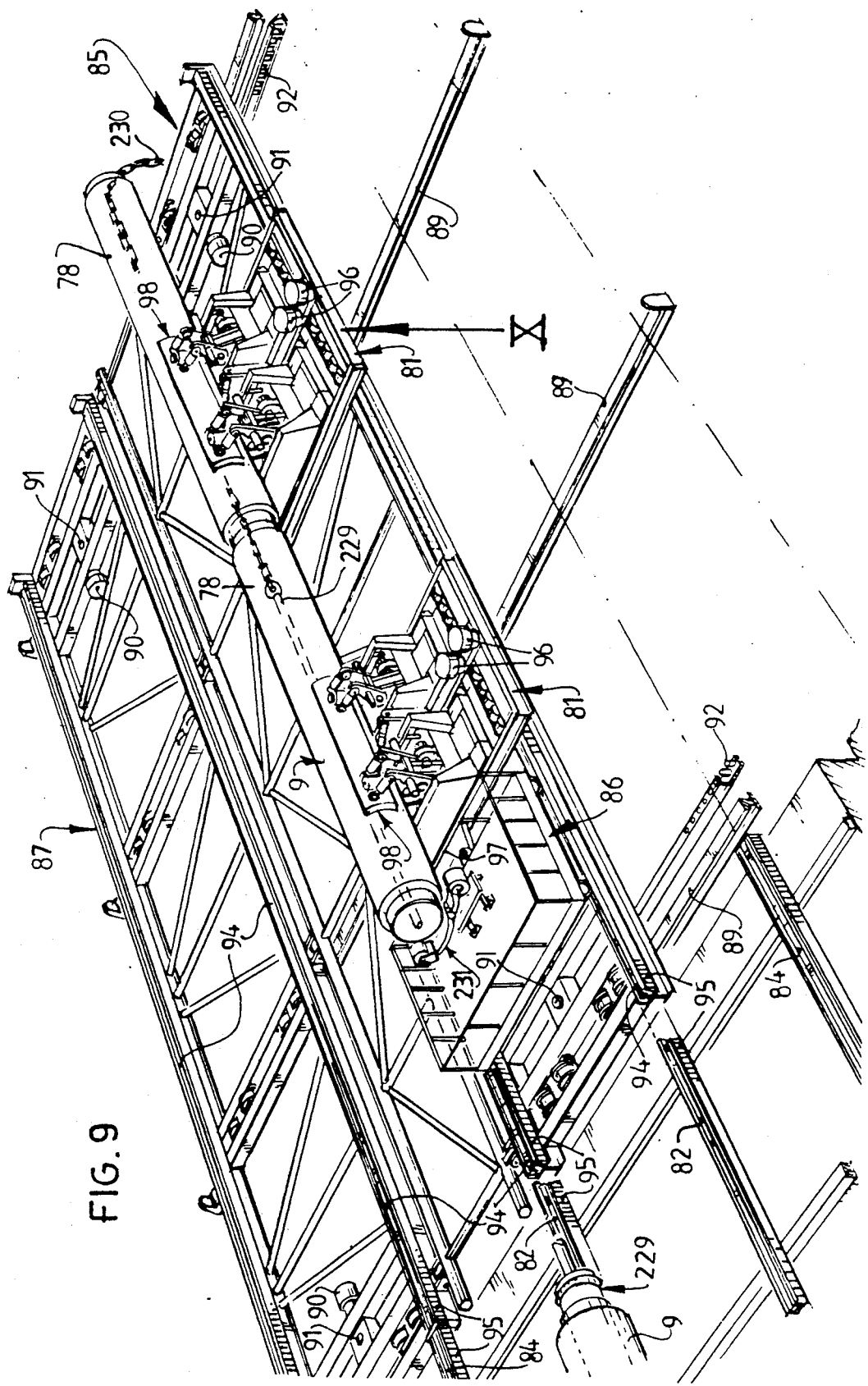

METHOD AND INSTALLATION FOR LAYING A PIPELINE

The invention relates to a method for laying a pipeline on a surface located under water, as designated in the heading to claim 1.

Such a method is known from GB-A-1155614. The placing and welding in alignment of a pipe to the pipe string is in principle an intermittent process in which the time lost has a detrimental effect on the laying speed. In order to increase the laying speed pipes are preferably placed in alignment with the pipe string by means of at least two alternately used pipe carriers. The laying of pipes can take place more rapidly in comparison with a conventional installation which comprises a vessel of corresponding length.

A further developed method according to the invention has the feature that the pipe string is supported from place to place by means of clamps which are clamped fixedly onto the pipe string and are then moved along with the pipe string but which are released from the pipe string and then moved along return rails in opposing direction relative to the vessel, while the movement of the pipe string relative to the vessel is braked using sufficient other clamps still clamped fixedly to the pipe string. The pipe string can then be properly carried and properly braked without interrupting activities at the location of the joints.

The invention also relates to and provides an installation for laying a pipeline on a surface located under water as designated in the heading of claim 3. This installation is characterized according to the invention by at least two pipe carriers to be used for alternately for placing pipes in line with the pipe string.

Mentioned and other features of the invention will be elucidated in the description following hereafter with reference to a drawing in which, in very schematic form:

FIG. 7 shows a partly broken away side view of a preferred embodiment of an installation according to the invention;

FIG. 8 is a top view of the installation from FIG. 7;

FIG. 9 shows on a larger scale detail IX from FIG. 8 in perspective view;

Figure 1:
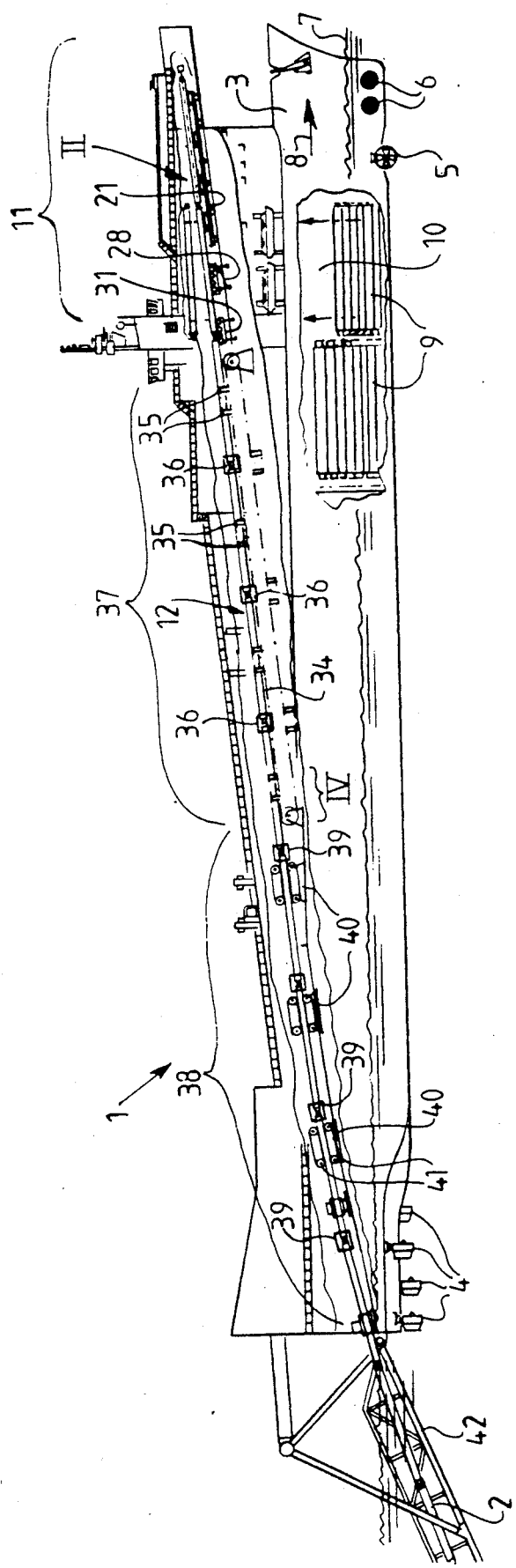
FIG. 1 shows a partly broken away side view of an installation according to the invention.

The installation 1 from FIG. 1 for laying a pipeline 2 on a surface located under water 7 comprises a vessel 3 with directionally adjustable screws 4 and 5 and bow steering screws 6 with which the vessel 3 can be moved forward in arrow direction 8 under computer control at a set speed and direction irrespective of the flow direction of the water 7. The vessel 3 has an workplace (not shown) where a number, for example two, three or four, pipe pieces are welded together and these welds protected with anticorrosive layers for the manufacture of pipes 9 with a length for example of 24 meters.

Figure 6:
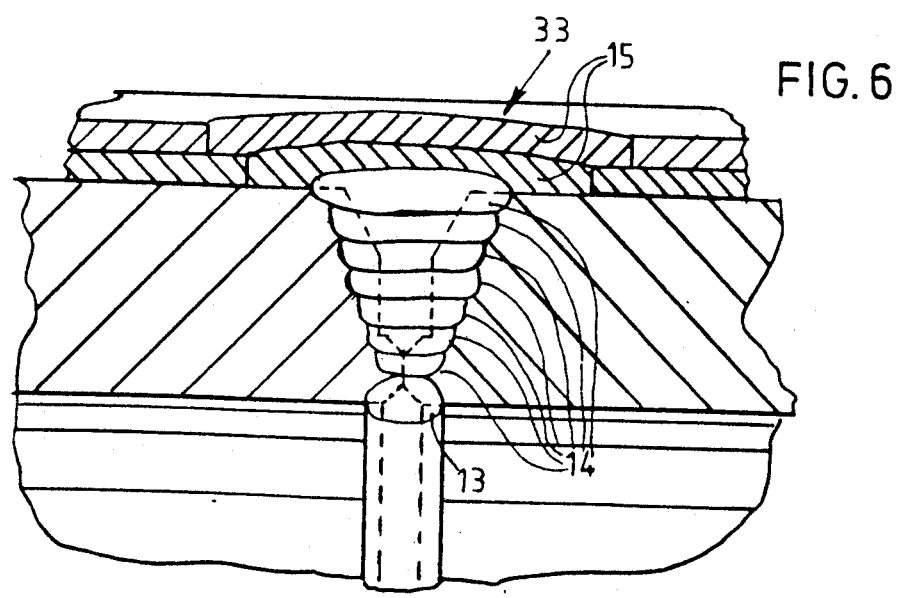
FIG. 6 shows on a larger scale a fraction of a joint between two pipes of a pipeline.

These pipes 9 are transported from a storage place 10, optionally via the said workplace, to a fitting station 11 where they are fitted piece by piece behind a pipe string 12 and where an internal weld 13 (FIG. 6) is made. Afterwards the welding layers 14 and the anticorrosive protective layers 15 are arranged consecutively from the outside. The welding work is meanwhile checked.

At the fitting station 11 in the bow of the vessel 3 the pipes 9 are lifted with a lifting frame 16 and placed over rollers 17 thereof onto rollers 18 of a conveyor 19 which transports the pipes 9 by means not shown in a transverse direction onto rollers 20 of an carriage 21. In order to avoid congestion in the supply of pipes 9 pipes 9 are delivered to the carriage 21 preferably from two sides by means of a conveyor 19.

A pipe 9 for fitting is in each case fitted behind and against a pipe string 12 with the carriage 21. A per se known tongue 22 comprising a clamp 23 which is clamped fixedly inside the last pipe 9 of the pipe string 12, a clamp 24 which is clamped fixedly inside the pipe 9 for fitting, a welding device 25 accommodated between these and centered by means of the clamps and a tube 26 extending through the pipe 9 for fitting for receiving operating lines and supply lines for the welding device 25 and a switch box 27 which protrudes outside the pipe 9 for fitting.

Figure 2:
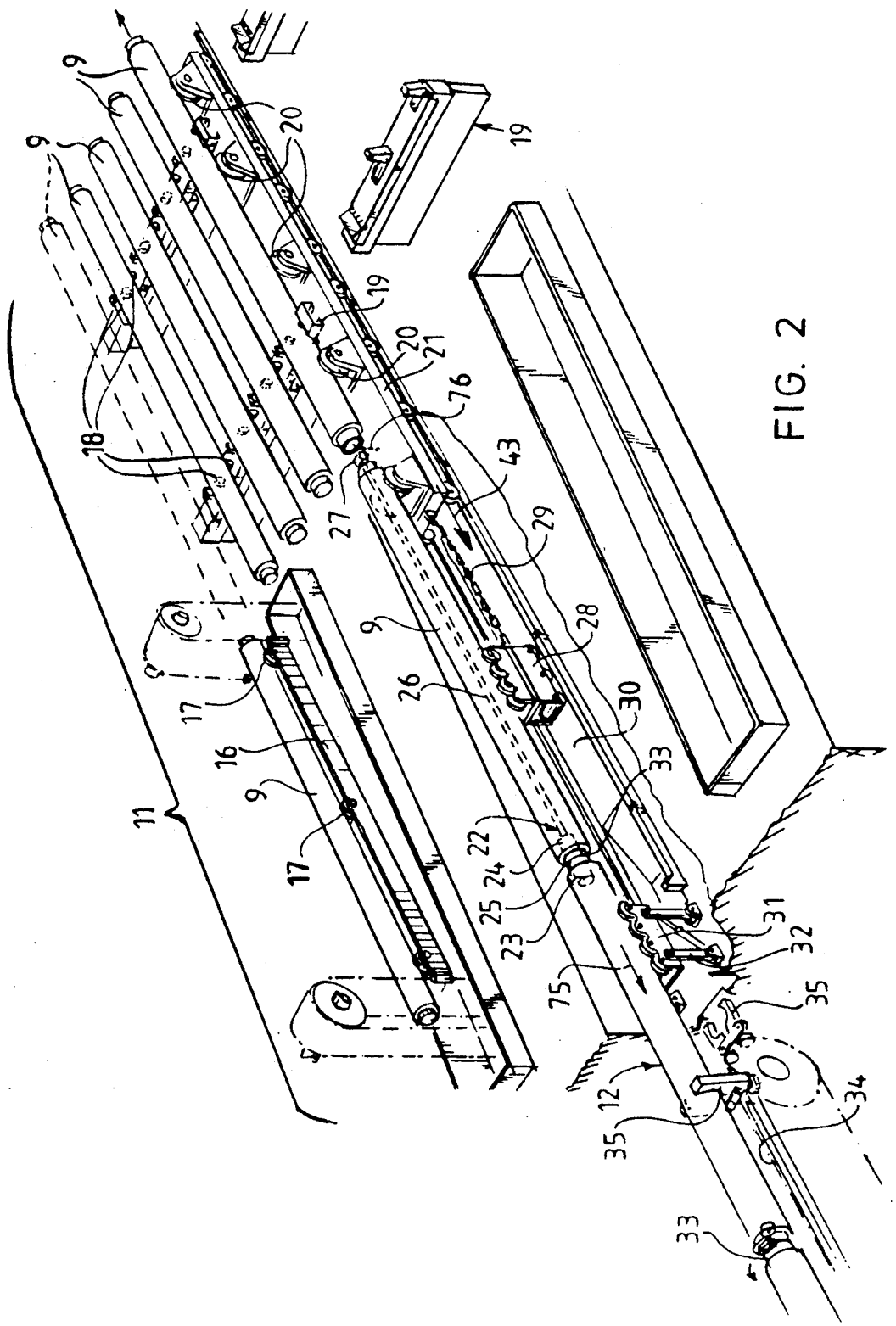
FIG. 2 shows on a larger scale a perspective view of detail II from FIG. 1.

While the pipe string 12 moves continually in arrow direction 75 relative to the vessel 3, the pipe 9 for fitting is pushed over the tongue 22 which is withdrawn from the fitted pipe 9 by means of its own drive unit (not drawn) or a chain 76, is placed in alignment and welded in place with an internal weld 13. In the meantime the pipe 9 for fitting is supported by the carriage 21 which as according to FIG. 2 moves along with the pipe string 12 at the same speed in arrow direction 43, as does a support carriage 28 which is coupled to the carriage 21 by its own drive unit (not drawn) or by a chain 29 and which supports on a rail 30 which at the end of the area slopes down away from the tongue 22 so that at this position the joint 33 can pass over this support carriage 28 while the carriage 21 can still support the pipe 9 for fitting. A fixed support 31 can be carried downward with a parallel frame 32 to allow the passage of a joint 33 of the pipe string 12. Connecting onto support 31 is a chain conveyor 34 with clamps 35 with which the pipe string 12 is clamped and supported. In each case there are two clamps present at a short mutual distance in order to be able to use at least one thereof irrespective of the location of a joint 33. Over the area 37 of the chain conveyor 34 the welding layers 14 are laid with welding devices 36 which are likewise moved along with the pipe string 12 and which at the end of their area 37 are moved in the opposite direction past operational welding devices 36 to the start of this area. In the area 38 adjoining thereto the protective layers 15 are applied with per se known application devices 39 which are moved with the pipe string 12 and which are moved back after finishing. An extra welding device 36 and an extra application device 39 of each sort is preferably present, which then move on different rails.

It goes without saying that the persons carrying out the relevant activities move along with the various equipment and devices.

The weight of the pipe string 12, which is further guided away in a sloping manner via a tail unit 42, has the tendency to slide off the vessel 3 and to sag in too sharp a bend. The vessel is therefore strongly driven with its screws 4 screws such that the part of the pipe string 12 suspended behind the vessel 3 is under considerable tensile stress. Situated in the area 38 are clamps 40 in the form of endless clamping strips 41 which transmit the tensile stress of the vessel 3 to the pipe string 12. The clamps 40 are preferably not fixed but run along with the pipe string 12 in order to be able to utilize the entire area as well as possible for work on the joints 33. To this end the pipe string 12 is preferably supported along the trajectories 37 and 38 by means of carriages 44 clamped fixedly to the pipe string 12 and which are then moved along with the pipe string 12 but which from time to time are individually released from the pipe string 12 and then moved in an opposite direction in trajectories 45 (see FIG. 4) relative to the vessel 3 such that in each case, of two adjoining carriages 44 at least one clamps fixedly to the pipe string 12. Each carriage 44 has two clamping jaws 47 energised by means of hydraulic cylinders 46 and a support frame 48 which supports the pipe string 12 via two sets of sloping rollers 49 and which is up and downwardly movable by means of a hydraulic cylinder 50 when passing a joint 33.

Figure 4:
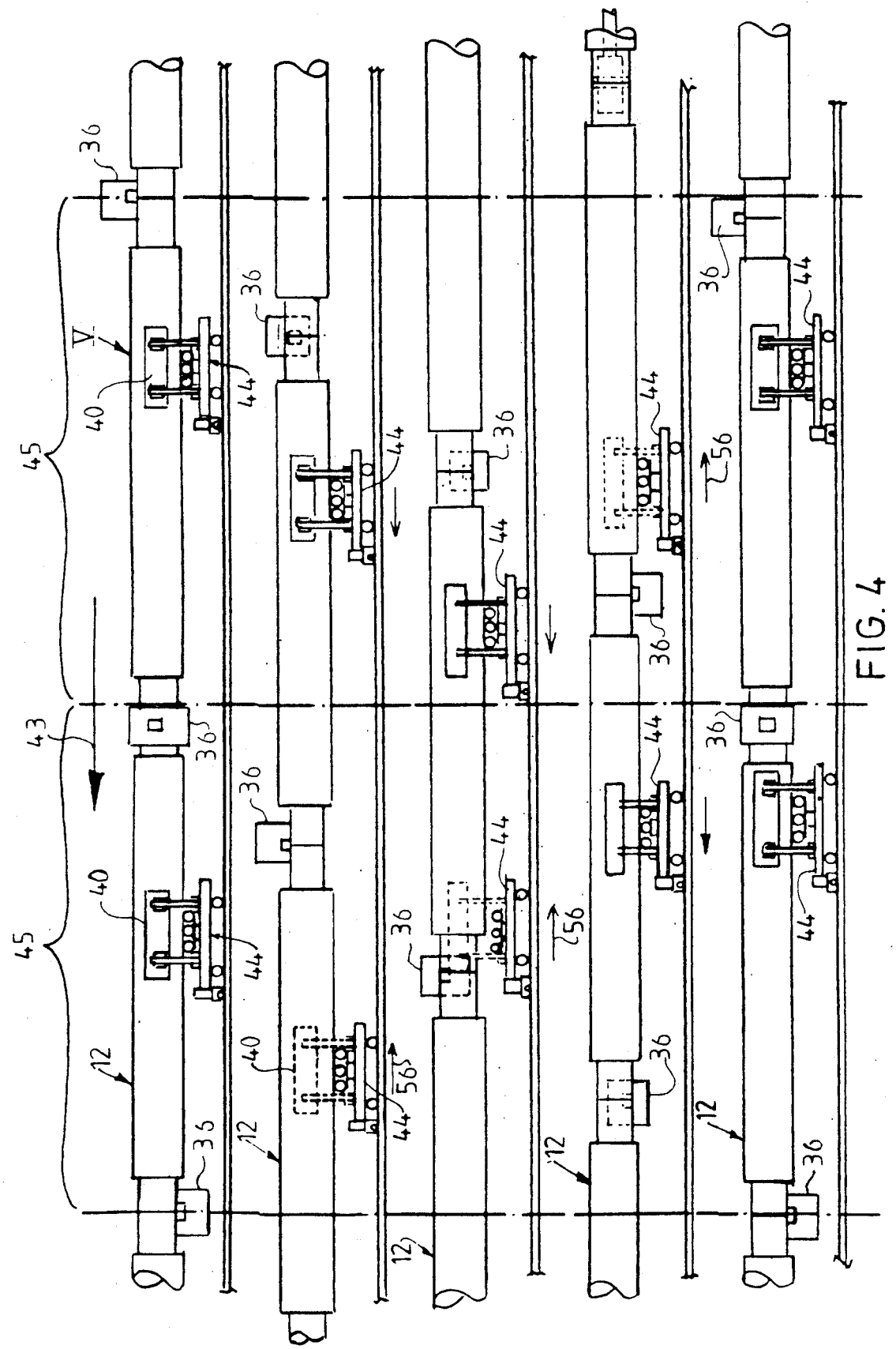
Figure 5:
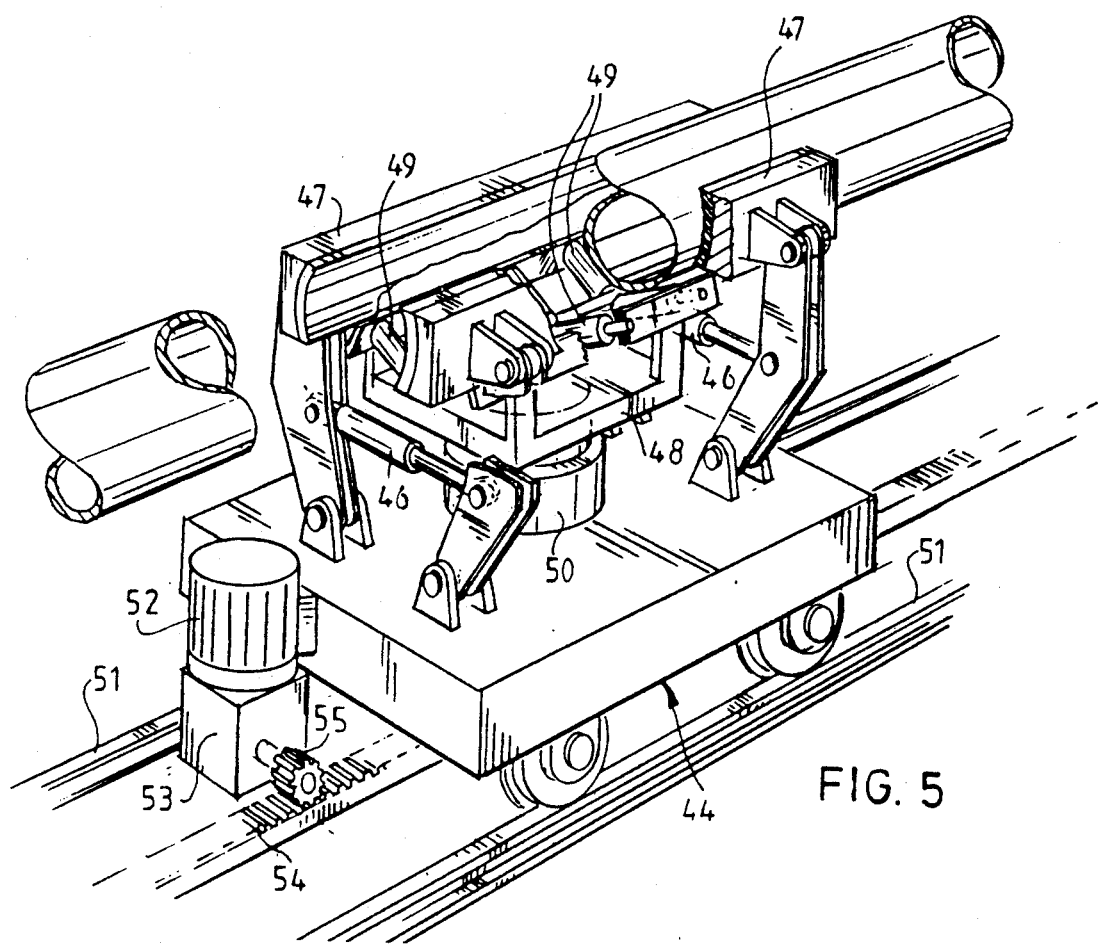
FIG. 5 shows on a larger scale a perspective view of detail V from FIG. 4.

The carriage 44 is guided on rails 51 and is braked and driven in arrow direction 56 by means of an electromotor 52 which engages with a pinion 55 onto a toothed track 54 via a reducing drive gear 53. In the diagram of FIG. 4 the nonfixedly clamped clamps 40 are drawn with broken lines.

Figure 3:
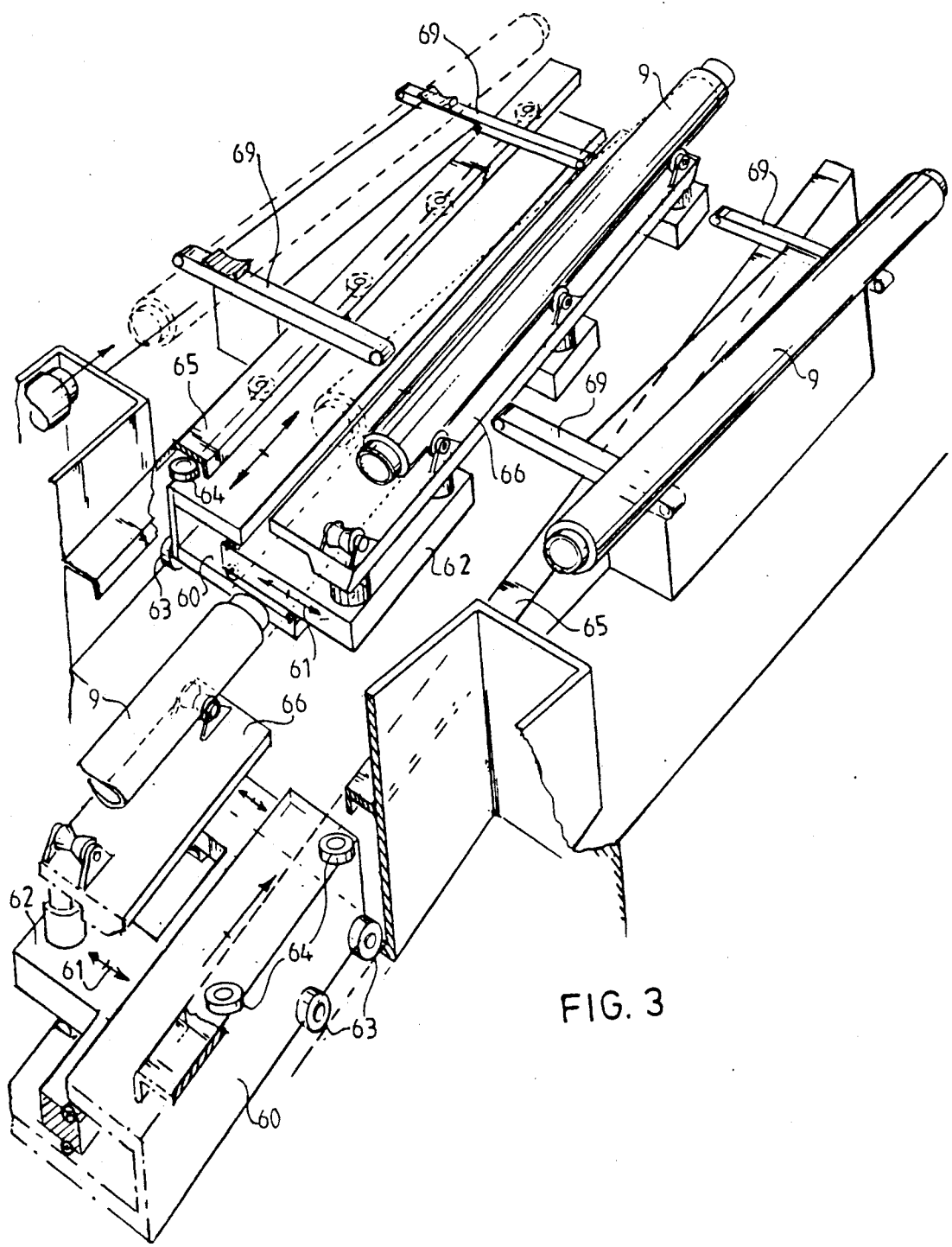
FIGS. 3 and 4 show on a larger scale details II and IV from FIG. 1 relating to a further developed embodiment of the installation according to the invention, respectively in perspective view and as a diagram of a number of different stages.

In FIG. 3 in a further developed method according to the invention are present two carriage 60 guided along rail 65 by means of rollers 63, 64 which carriages are each provided with a bearing table 62 movable in a transverse direction according to arrows 61 and which can carry a pipe 9 for fitting via an up and downward movable roller table 66.

While one of both carriage 60 moves along with the pipe string 12 a new pipe 9 is transported via transverse conveyors 69 to a roller table 66 retracted in transverse direction, which pipe is taken over by this roller table 66. Since these roller tables 66 are guided via their carriages along different rails and are displaceable in transverse direction it is possible, practically immediately after a pipe 9 for fitting has been welded into position, to retract the relevant carriage 60 in a transverse direction and to arrange the following pipe 9 in alignment against the pipe string 12 with the other carriage 60.

The carriage 21, 60 can be coupled mechanically or by means of a computer controlled drive motor to the pipe string 12, or be coupled to a carriage clamped to the pipe string 12.

The installation 101 from FIG. 7 for laying a pipeline on a surface located under water comprises a vessel 103 with directionally adjustable screws 104 and 105 and bow steering screws 106 with which the vessel 103 can be moved forward under computer control in arrow direction 8 with a set speed and direction irrespective of the flow direction of the water 7. The vessel 103 has a workplace 77 on both the port and starboard sides where a number of, for example two, pipe pieces 78 are welded to each other and these welds are protected with anticorrosive layers for the manufacture of pipes 9 with a length of, for example, 24 meters. The pipe pieces 78 are transported from storage places 110 via passages 79 to the workplaces 77 and are loaded at delivery station 80 on pipe carriers 81 as pipes 9 and transported to a fitting station 111 where they are fitted one by one behind a pipe string 112.

With the installation 101 the pipe string 112 is carried by pipe carriers 81 which travel on rails 82 over the deck of the vessel 103 in arrow direction 83 relative to the vessel 103. As FIG. 8 shows, return rails 84 lie on either side of the rails 82. For each pipe 9 one train 85 is used consisting of two pipe carriers 81 and a welding carriage 86. A rail switch 87 is present on the bow at the fitting station 111 and a rail switch 93 is located behind the welding area 137. Each rail switch 87 and 93 is reciprocally movable in transverse direction according to arrows 88 along transverse rails 89 by means of motors 90, toothed drive gear 91 and toothed brackets 92 (FIG. 9) and has rails 94 which connect to rails 82 and to return rails 84. All the rails mentioned are provided with toothed brackets 95 onto which engage hydraulic toothed wheel units 96 of the pipe carriers 81. To power these units each pipe carrier 81 has an undrawn electric-hydraulic power converter (not drawn).

Figure 10:
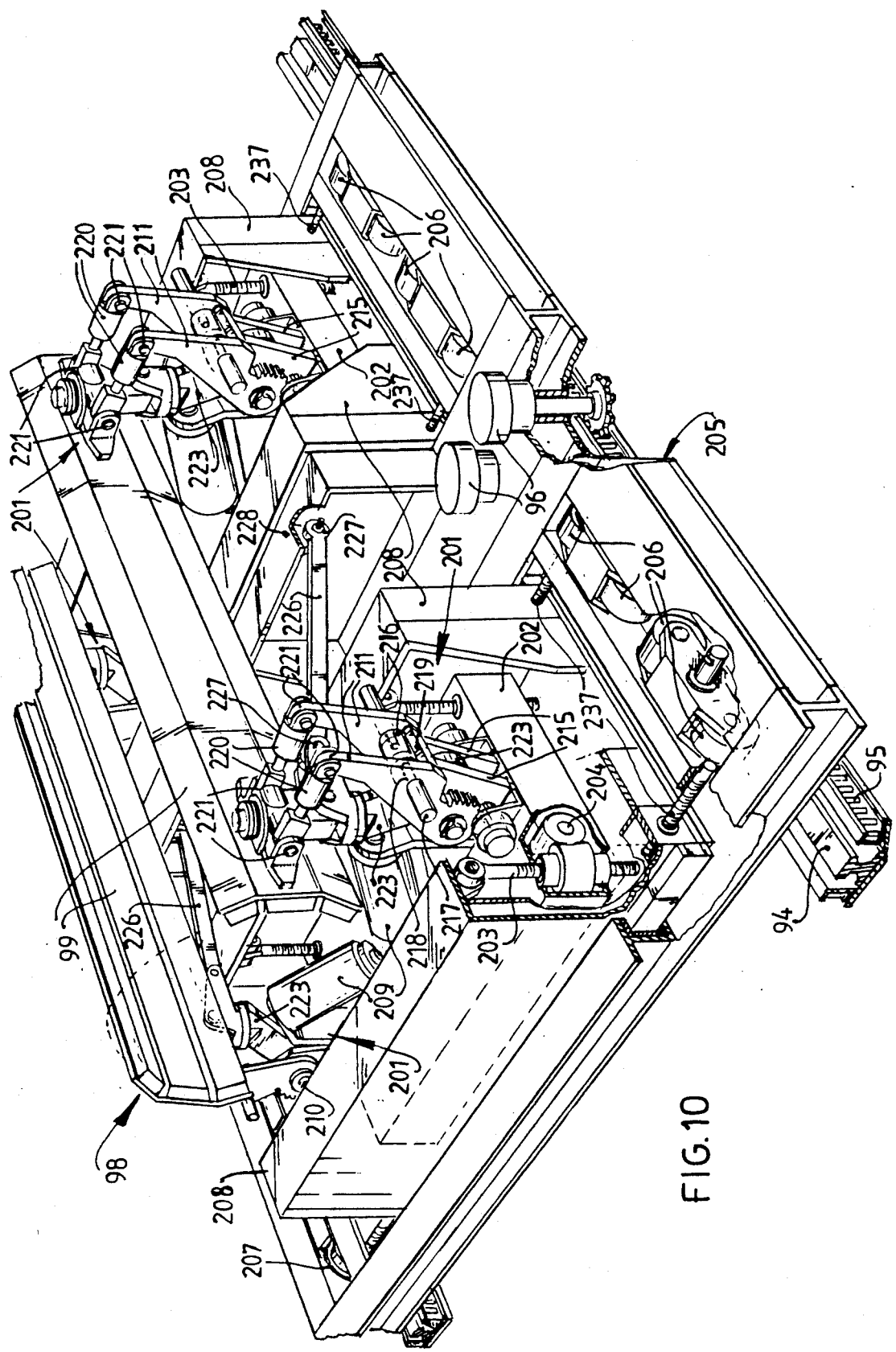
FIG. 10 shows on a larger scale detail X from FIG. 9 in perspective view.
Figure 11:
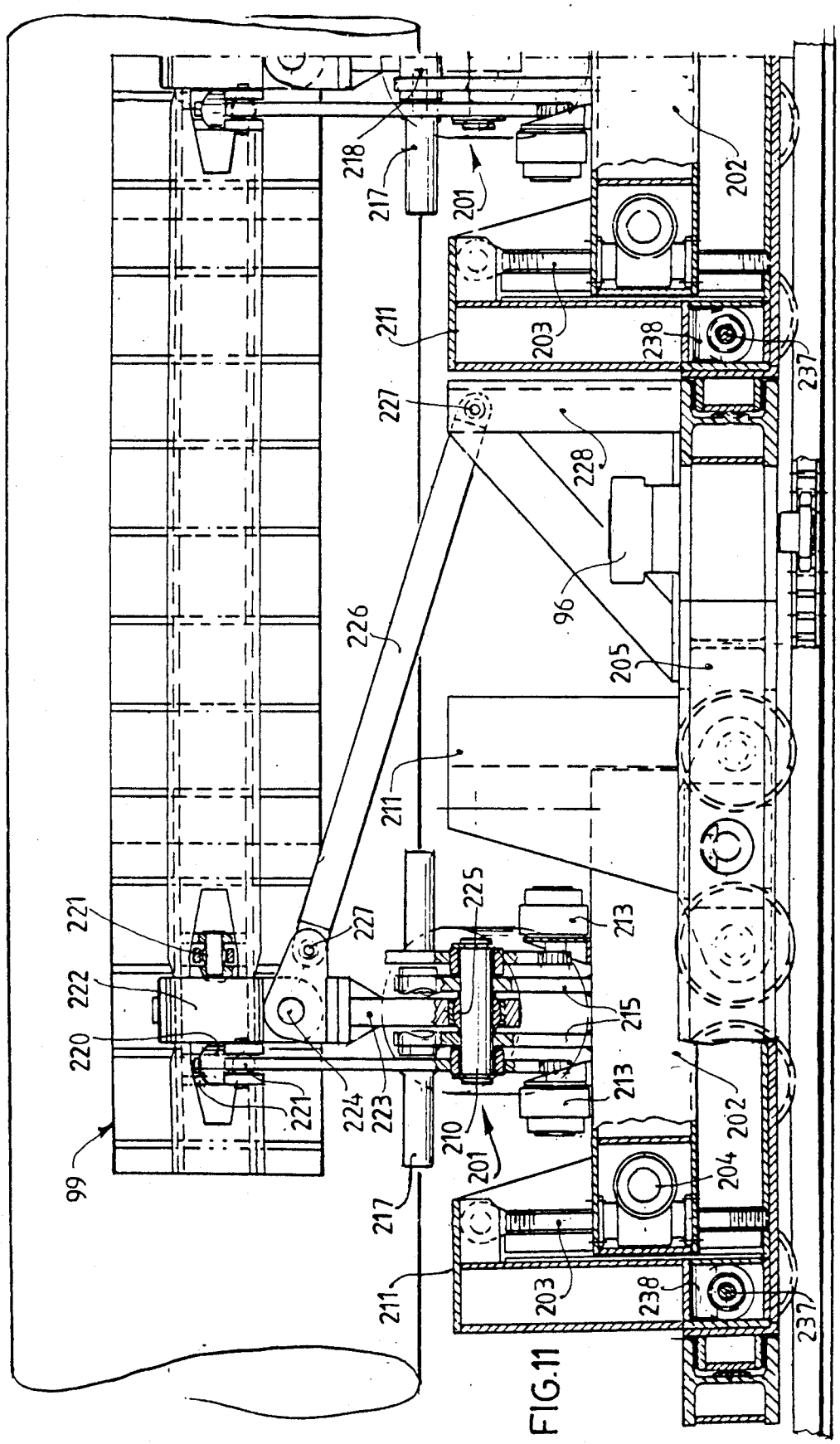
FIG. 11 shows on a larger scale a broken away side view of detail X from FIG. 9.

The welding carriage 86 is coupled by means of a coupling 97 to a pipe carrier 81. Each pipe piece 78 is carried by a pipe carrier 81 by means of a clamp 98 which has two clamping jaws 99 which are each carried via an arm 201 by a platform which is level-adjustable along vertical screwed rods 203 by means of toothed wheel units 204 (FIG. 10) relative to the carriage chassis 205 which supports on rails by means of unflanged rollers 206 on the one side and by means of flanged rollers 207 on the other side. The platform 202 is guided in consoles 208 and carries the pipe piece 78 by means of rollers 209. The consoles 208 are displaceable in transverse direction relative to the chassis 205 by means of screwed rods 237 and hydraulic motors 238. In this way the clamps 98 are adjustable with fine adjusting means in lengthwise and transverse direction in order to set a pipe 9 in alignment with the pipe string 112.

Figure 12:
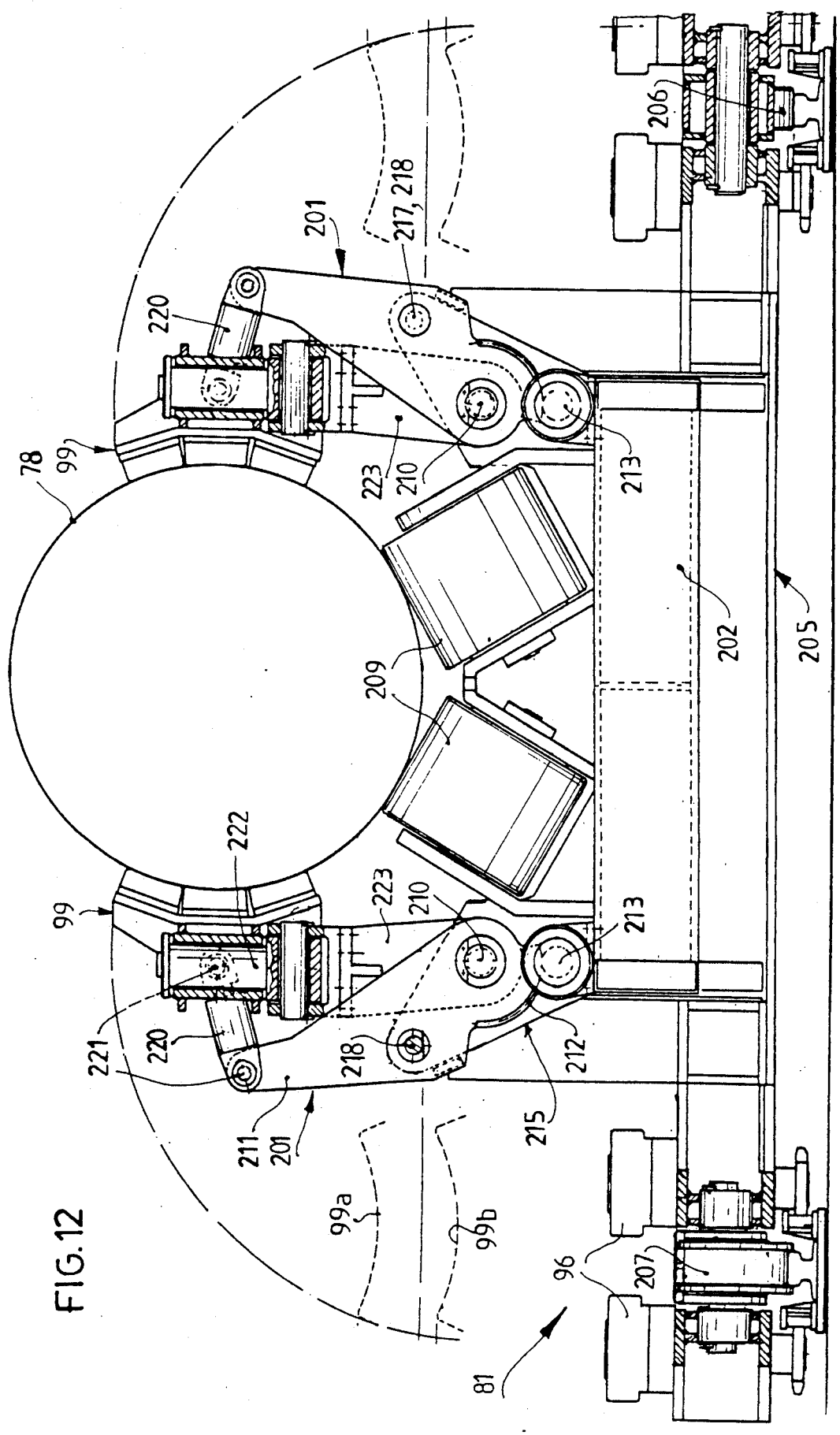

Each arm 201 has two elements 211 pivotable around a shaft 210 and provided with gear rims 212 which coact with a hydraulic toothed wheel unit 213 for adjusting the clamping jaws 99 between an active position drawn with full lines in FIG. 12 and a rest position 99a drawn with broken lines which can be lowered to the switch position 99b by causing the platform 202 to descend so that the clamping jaws 99b can pass under the pipe piece 78 when the pipe carrier 81 is displaced transversely.

Situated between the elements 211 is a fixed elevation 215 with a locking sleeve 216 for receiving locking pins 218 supported by the elements 211 and driven by hydraulic cylinders 217. A stop 219 which connects the two elements 211 strikes against the elevation 215 in order to position the locking pins 218 in line with the locking sleeve 216. Each element 211 is connected to a clamping jaw 99 via clamp cylinders 220, via spherical hinges 221 and via a cross-coupling hinge 222. Only three of the arms 201—and not all four in order to prevent statical over-determination—each have a support arm 223 which is swivellable about the shaft 210 by means of a spherical hinge 225 and which is connected for pivoting to the cross-coupling hinge 222 by means of transverse hinge 224. Per clamping jaw 99 there is a stanchion rod 226 which connects the cross-coupling hinge 222 to an elevation 228 of the chassis 205 via spherical hinges 227.

In FIG. 8 and 9 the rail switch 87 is in a position such that a train 85 with a pipe 9 is substantially aligned with the pipe string 112. A tongue 229 is then pulled therein by means of a chain 230 and the train 85 is subsequently moved up against the pipe string 112. By level changes and transverse adjustment of the platforms 202 the pipe 9 is exactly aligned relative to the pipe string 112. The welding device 231 is subsequently arranged with the necessary alignment clamps around the joint to be welded and the welding work can be carried out while the train 85 moves along with the pipe string 112. In the meantime a following train 85 is moved onto the other track of the rail switch 87 so that as soon as the preceding train 85 has left the rail switch 87 this train 85 stands ready for the next pipe fitting through transverse displacing of the rail switch 87. A following train 85 can thereupon be driven onto the once again free track of the rail switch 87 on the other side of the vessel 103.

As the weld becomes strong enough the pipe 9 is clamped more firmly by the clamps 98 and the pipe carriers 81 are more firmly braked in order to hold the pipe string in position 112 with tensile stress.

At the end of the welding area 137 the foremost pipe carrier 81 is moved towards the rearmost so that a short train 85 arrives on the rail switch 93.

The switching back and forth of the rail switch 93 can then take place while the following welding carriage 86 still has a little extra time available before it arrives at the rail switch 93, at which moment this rail switch 93 must be ready for receiving this welding carriage 86. Behind the rail switch 93 follows an X-ray control section 233 and thereafter a finishing area 234 with tensioners 235.

It is noted that the trains 85 travelling over the return rails 84 pass along the work places 77 and then carry the pipes 9 along in arrow direction 236 to the fitting station 111.

With this installation 101 the length of the ship is very efficiently used, this because work can be done at the welding location practically continuously along the entire length of the vessel 103, partly as a result of the fact that the pipe carriers 81 also brake the pipe string 112 so that the total of ship length where stationary disposed tensioners 235 are situated is minimal.

I claim:

1. Installation (1) for laying a pipeline on a surface located under water, comprising a vessel (3) provided with positioning means (21, 23, 24, 60) for holding a pipe (9) in line behind a pipe string (12) of the pipeline (2) and welding means (25) for fixedly welding this pipe (9) onto said pipe string (12) comprising positioning means (21, 23, 24, 60) which during welding of said pipe (9) to said pipe string (12) said positioning means are moved relative to said vessel (3) at a speed which corresponds with the relative speed of said pipe string (12) relative to said vessel (3), whereby said positioning means (21, 23, 24, 60) are provided with at least one carriage (21, 60) for bearing the pipe (9) for fitting, which carriage (21, 60) is movable at substantially the same speed as said pipe string (12) relative to said vessel (3), characterized by at least two pipe carriers (21, 60) to be used alternately for placing pipes (9) in line with said pipe string (21).

2. Installation as claimed in claim 1 in which said positioning means includes clamping carriages and clamps adjustable relative to said clamping carriages in transverse direction to the vessel and also level-adjustable relative to said clamping carriages.

3. The installation as claimed in claim 1 or 2 which includes clamps having clamping jaws which are adjustable between a position fixedly clamping the pipe string and a release position whereby said clamping jaws are located at a lower level than the local level of the underside of said pipe string.

4. Installation as claimed in claim 1 or 2 which includes at least one rail switch comprising a platform adjustable in transverse direction of the vessel for transporting at least one pipe carrier.

5. Installation as claimed in claim 1 in which said positioning means includes a plurality of clamps supporting the pipe string, said clamps travelling on rails guiding in the direction of said pipe string for clamping gripping said pipe string, said clamps arranged for braking said pipe string and for displacement relative to the vessel over return rails in a direction opposed to the movement of the pipe string.

6. Method for laying a pipeline form a vessel onto a surface located under water by placing in line and fitting a pipe to a previously formed pipe string of the pipeline while said vessel is moving substantially continuously in the lengthwise direction of said pipe string, said pipe being held in line behind said pipe string by positioning means and welded thereto by welding means whereby said positioning means and said welding means are moving relative to the vessel, said pipe being supplied from at least two alternately used pipe carriers.

7. The method of claim 6 which includes supporting said pipe string as it moves from a first location to a second location by clamping means having at least two clamps which at a first location are clamped fixedly to said pipe string thereby moving with said pipe string and at a second location one of said clamps being released from said pipe string and mvoed over return rails in a direction opposing the movement of said pipe string while the movement of said pipe string is sufficiently braked by the clamping means stil clamped fixedly to said pipe string.

* * * * *